Oct. 10, 1939.    S. J. ERLING    2,175,596

BELLOWS FOR MILKING MACHINE PULSATORS

Filed Jan. 26, 1935

WITNESS:

INVENTOR
Sven Johan Erling
BY
ATTORNEYS

Patented Oct. 10, 1939

2,175,596

UNITED STATES PATENT OFFICE 2,175,596

BELLOWS FOR MILKING MACHINE PULSATORS

Sven Johan Erling, Nockeby, Sweden, assignor to The De Laval Separator Company, New York, N. Y., a corporation of New Jersey Application January 26, 1935, Serial No. 3,596
In Sweden February 10, 1934

3 Claims. (Cl. 164—17)

For certain purposes, for instance, for pulsators for milking machines, it is necessary to have bellows which can stand a considerable difference of pressure without being deformed in other directions than the one in which it moves during operation.

The object of the invention is to provide bellows of this characater. In my invention the bellows consists of a number of wall sections hinged one to another and therefore longitudinally expansible and contractible, but which are not capable of substantial expansion and contraction diametrically, that is, in any other direction than the intended direction of expansion and contraction.

Figure 1:
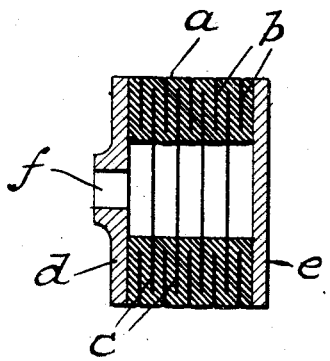
Fig. 1 is a longitudinal sectional view of one form of bellows embodying my invention, the bellows being compressed.

In Fig. 1, $a$ represents the cylindrical or tubular wall of the bellows. It may be formed from a thick-walled tube or hose of elastic material, preferably rubber. By means of a knife or other suitable cutting instrument, there is cut in the wall a number of radial grooves or slits $b$ extending from the outer surface of the wall to more or less near the inner surface. Alternating with grooves $b$ are cut in the wall radial grooves or slits $c$ extending from its inner surface to near its outer surface. It is practicable to perform both of these on a lathe. Thereby is formed a plaited cylindrical wall. Facing plates $d$ and $e$ are applied to opposite ends of the plaited cylindrical wall, one of which has a central hole $f$ adapted to be used either for fixing the bellows or for establishing communication between the interior of the bellows and an outside chamber.

Figure 2:
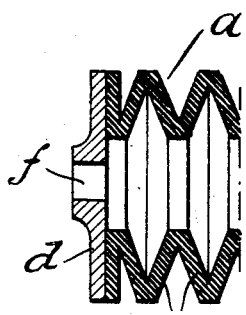
Fig. 2 is a view of the same structure with the bellows expanded.

Bellows constructed in accordance with Figs. 1 and 2 may be easily stretched in a longitudinal direction but offer a comparatively great resistance to deformation in a radial direction. The bellows has the advantage that it consists of entirely homogeneous material without any joints. The risk of leakage and also of cracks in the folded portions is thereby eliminated.

What I claim and desire to protect by Letters Patent is:

1. Bellows comprising a thick walled hollow cylinder of flexible and elastic material having therein circumferentially extending cuts in its exterior face of negligible width throughout their depth and of a depth equal to a major portion of the distance from the exterior surface to the interior surface and, alternately therewith, circumferentially extending cuts in its interior face of negligible width throughout their depth and of a depth equal to a major portion of the distance from the interior surface to the exterior surface, adjacent cuts being spaced apart a distance multiple times their width but only a fractional part of their depth, the annuli formed by the cuts when the bellows are not expanded being substantially contiguous and when the bellows are stretched longitudinally offering such great resistance to deformation in a radial direction as to be of substantially no greater internal diameter and no lesser external diameter than when the bellows are contracted.

2. Bellows comprising a thick solid walled cylinder of flexible and elastic material which is provided with two series of circumferentially extending slits of negligible width throughout their depth extending in planes at approximately right angles to the axis of the cylinder, one series of slits extending from the outside of the wall toward the inside thereof and the other series of slits extending from the inside of the wall toward the outside thereof, the slits of both series being of substantially equal depth and extending a major portion of the distance from one surface to the other and the slits of one series alternating with those of the other, adjacent slits being spaced apart a distance multiple times their width but only a fractional part of their depth, whereby the bellows when not stretched form a substantially solid cylindrical wall and may be expanded longitudinally to form a cylinder wall having alternating inner and outer grooves but of substantially the same thickness as when longitudinally contracted.

3. Process for producing extensible bellows which comprises forming a thick solid walled cylinder of flexible and elastic material, cutting at approximately right angles to the axis of the cylinder circumferentially extending slits of negligible width and extending a major portion of the distance from the exterior surface to the interior surface and, alternately therewith, cutting circumferentially extending slits at approximately right angles to the axis of the cylinder and of negligible width and extending a major portion of the distance from the interior surface to the exterior surface, and spacing adjacent slits apart a distance that is only a fractional part of the depth of the cuts but is multiple times the width of the slits, whereby the bellows when not expanded form a substantially solid cylindrical wall and when stretched longitudinally form a cylinder wall having alternating inner and outer grooves but of substantially the same thickness as when longitudinally contracted.

SVEN JOHAN ERLING.